United States Patent Office 3,325,635
Patented June 13, 1967

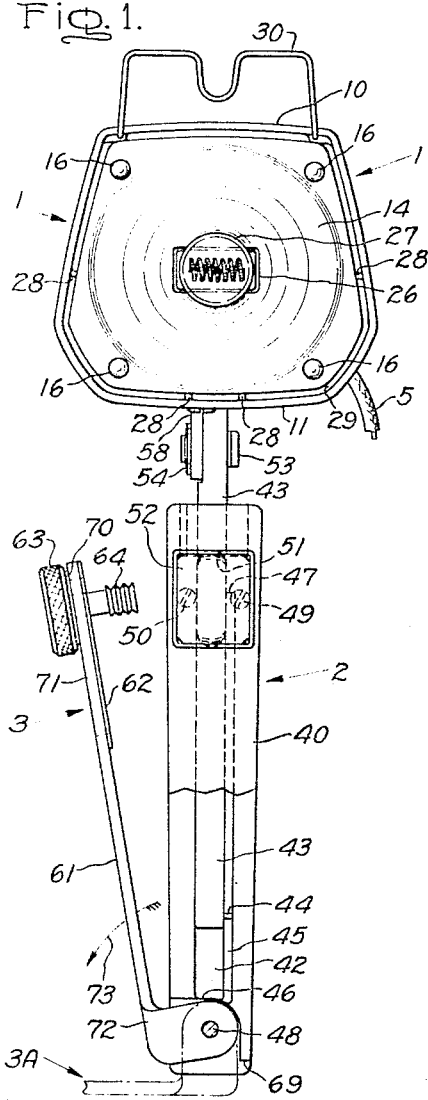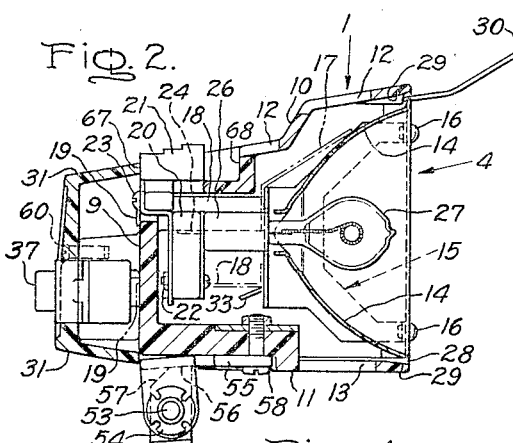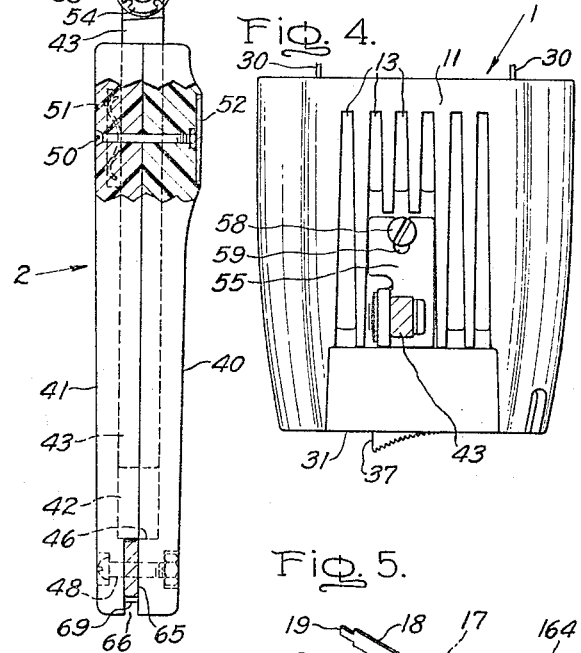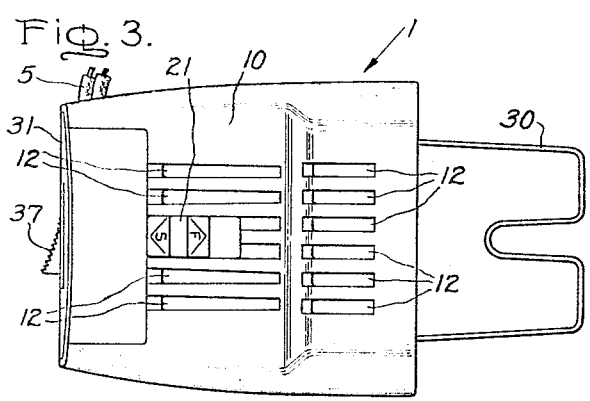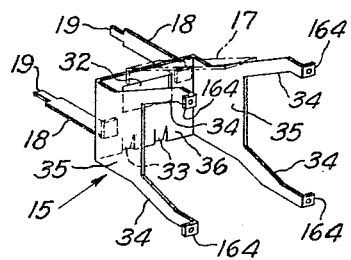
Inventors:
Donald M. Wagner
Edward H. Dalton
by Richard H. Burgess
Their Attorney

3,325,635
MOVIE LIGHT
Donald M. Wagner, Cleveland, and Edward H. Dalton, Chesterland, Ohio, assignors to General Electric Company, a corporation of New York
Filed Apr. 30, 1965, Ser. No. 452,315
5 Claims. (Cl. 240—1.3)

The present invention relates to a light adapted to be attached to a movie camera and used to illuminate the field to be photographed by the camera. More particularly, the invention relates to such a movie light adapted to be powered by a separate source of electrical power.

As camera-mounted movie lights are made brighter and more efficient, problems caused by heat generated in the lamp become more severe and more difficult to overcome. This is especially so in such movie lights that are for the most part fabricated from plastic organic materials. Plastics as materials of construction for such uses can be considerably less expensive than metal fabricated parts. However, heat from the lamp can even be a serious problem with non-organic constructions due to high temperatures of exposed parts and for other reasons.

Therefore, it is an object of the present invention to provide a compact movie light design that minimizes heat transfer from the lamp to the exterior parts of the movie light.

A further object of the invention is to provide a design for the structure of such a movie light that will allow the reflector to operate at a temperature considerably above the degradation temperature of the plastic materials used as the principal materials of construction of the movie light itself.

Another object of the invention is to provide such a movie light mounted on a handle by a swiveling means which allows the light to be directed upwardly at an angle to provide indirect or bounce-type lighting on a subject to be photographed by a movie camera attached to the handle.

Still another object of the invention is to provide such a movie light which is mounted on a handle by extensible means to allow the light to be raised for providing additional vertical separation between the light and camera lens.

In the drawings,

FIG. 1 is a front elevation, partly in section, of a movie light mounted on a handle according to the invention with a camera attachment bar pivoted upwardly to a position next to the handle, and the bar also is shown in partial phantom outline in its outwardly extended position.

FIG. 2 is a side elevation, partly in section, of a movie light according to the invention, illustrating the inner structure of the head unit housing portion of the movie light.

FIG. 3 is a top plan view of a movie light according to the invention.

FIG. 4 is a bottom plan view, partly in section, of a movie light according to the invention.

FIG. 5 is an isometric view of a mount structure used to secure a reflector into said movie light. This mount structure constitutes a principal means for dissipating heat that would otherwise be conducted from the reflector to the movie light housing and cause overheating and an unacceptable rise in temperature.

Briefly stated, according to one aspect of the present invention, a compact movie light is provided comprising a head unit housing having a top portion and a bottom portion. Both the top and the bottom portions are discontinuous in that they are provided with ventilation slots which constitute means allowing the passage of convection currents of air up through the housing. These convection currents are generated by heat within the housing and serve to cool a reflector mounting structure which is secured at its forward end to a reflector and at its rear end to a rear portion of the housing. The reflector itself makes only essentially point contacts with at least three points around the front opening of the housing to minimize direct heat conduction from the reflector to the housing. The reflector mount traverses the interior of the housing across the area through which the convection currents flow from the discontinuous bottom up to and out through the discontinuous top and acts as a substantial heat dissipator or heat transformer. This cooling effect allows the reflector to operate at a temperature so high that it would otherwise overheat the housing, either causing degradation of the materials of construction or creating a hazard because of its elevated temperature. Furthermore, the reflector in movie lights of the invention can be recessed into the housing to minimize exposure of the cameraman to chance contact with the reflector. Mounting means are also provided for a lamp to allow electrical connections to be made behind the reflector with the light producing portion of the lamp so located in the reflector as to give the desired illumination.

Further features of the invention that are useful in specific embodiments are means within the housing for breaking up direct upward convection currents of air coming from the vicinity of the lamp which might otherwise cause overheating in the head structure, lamp connection means to permit the lamp to be positioned in the reflector to obtain interchangeably both a widely divergent light beam for floodlighting and a narrowly divergent beam for spotlighting, provisions for mounting the head structure on a lamp handle by a swiveling means so that the lamp can be angled upward to furnish indirect or bounce-lighting for illuminating the subject to be photographed, and an extensible means in the movie light handle to allow the light to be raised above the camera level.

The extensible handle feature permits people and animals to be photographed in a more natural appearance since they can look at the camera without being annoyed by the direct beam of the lamp. This also prevents undesirable red reflections from the eyes of subjects which would be recorded on color film.

In one preferred embodiment of the invention, it has been desirable to use a high temperature phenolic plastic to form the housing by injection molding. With this material, and using the structure of the invention, a practical movie light has been made which is adapted to use effectively and efficiently a 650 watt incandescent lamp of the type known as a single-ended, halogen-cycle lamp. Such a lamp may have a bulb of fused silica or essentially silica, such as Vycor, containing an inert gas such as nitrogen, and a quantity of halogen, such as iodine or a bromine compound. Since the amount of heat generated by this lamp is greater than that which could be well tolerated by previously known movie lights of this type that could be made as compact as desired, the present invention provides a much-needed means for utilizing the light from this highly efficient and compact lamp.

Referring now to the drawings,

FIG. 1 illustrates the movie light of the invention with the head unit housing shown at 1, a handle at 2, and a camera mounting bar at 3. The camera mounting bar 3 is illustrated in a partially folded position adjacent the handle 2. At 3a, the camera bar is partially indicated in phantom lines in the position in which it normally is used with a camera.

Housing 1 comprises a top portion 10 and a bottom portion 11 which may be molded into the same piece to form a unitary housing. Top portion 10, in this embodiment, is provided with slots 12, and bottom housing 11 is provided with slots 13 which allow cooling convection currents of air to pass upwardly through the housing when heat is being generated within the housing as by lamp 27 when it is lighted.

Top portion 10 and bottom portion 11 at least partially define a front opening, indicated at 4, in which a reflector 14 is positioned. Reflector 14 is held in position partly by mounting means such as reflector mount 15 indicated in FIG. 2 and illustrated in isometric view in FIG. 5. This reflector mount 15 is attached to reflector 14 by four rivets 16, attached to reflector mount 15 at points 164. Reflector mount 15, in turn, is attached to housing 10 through an internal rear wall 9 by means of mounting bars 18 which terminate in tabs 19 which are inserted through holes in wall 9 and bent over to lock mount 15 in place. Thus, reflector 14 is secured to housing 10 only at the rear of the housing, giving a long, resistant path for heat transfer mount 15. To further enhance the temperature drop from the reflector mounting point 164 to locking tabs 19, mount 15 is provided with small cross sections as at 34 and 18 wherever possible. Side sections 35 and rear section 36 provide stabilization for mount 15.

Also, mount 15 may be provided with a convection current disrupter 17 shown in dot-dash lines in FIGS. 2 and 5 to scatter and disperse the direct vertical motion of convection currents of hot air arising directly from lamp 27.

Rear portion 36 of mount 15 contains a rectangular hole 32 through which the base 26 of lamp 27 may be inserted for physical and electrical connection to connector 20 in socket holes indicated at 24. This hole 32 closely fits the lamp 27 to mimize direct thermal radiation from lamp 27 back into housing 1. Connector 20, in turn, is mounted by fasteners 22 and 23 to the position selector switch 21. This switch 21 allows lamp 27 to be moved to a rear position in reflector 14 to produce a narrowly divergent light beam for spotlighting and to a forward position to produce a more widely divergent light beam for floodlighting. In the rear position, and as a brace for inserting lamp 27 into connector 20, the front face of wall 9 acts as a stop along with rear wall 67 of the slot in which switch 21 rides. In the forward position, and as a brace for removing lamp 27 from connector 20, tabs 33 on the rear of mount 15 act as a stop along with front wall 68 of the slot for switch 21.

Although the structural mounting and bracing of reflector 14 is accomplished through mount 15 which is secured at rear wall 9, reflector 14 is also held in the desired position by essentially point contact with three or more positioning contacts 28 on the front face 4 of housing 1. Four positioning contacts 28 are illustrated. These contacts 28 extend up to the front face 4 of housing 1 over beveled edge 29 to permit more accurate positioning of reflector 14. The combination of contacts 28 and beveled edge 29 provides an air gap between reflector 14 and front opening 4 to also aid in cooling. This design of essentially point contacts allows the reflector 14 to operate at temperatures substantially above the degradation temperature of the plastic material of construction used for housing 1. Although these point contacts 28 are molded integrally into housing 1 and can be the same material as the housing, there is little heat conduction through such small points into the rest of housing 1 and deterioration will be retarded. As an example, the maximum stable operating temperature of reflector 14 in a preferred embodiment of the invention may rise as high as 375° C. The main areas of contact providing metallic heat conduction from reflector 14 to housing 1 are locking tabs 19 in rear wall 9. The temperature at these points may be in the neighborhood of 200° C. The degradation temperature of high temperature phenolic plastics used in this embodiment can be about 260° C.

Materials of construction for the various parts of the movie light are selected to withstand the required temperatures.

Behind rear wall 9, an OFF-ON switch 37 may be mounted in rear housing 31, and secured to wall 9 by means of fasteners as at 60. Electrical inlet cord 5 may be connected to switch 37 through rear housing 31. Inlet cord 5 at its other end can terminate in any desirable type of connection, preferably a two-prong male plug.

At the upper edge of front face 4, a wire protector 30 may be mounted. This protector 30 acts as a safety feature to minimize likelihood of flamable materials coming too close to lamp 27 when it is lighted and hot.

Housing 1 can be mounted to handle 2 as illustrated by means of a vertical pivot 53 allowing the housing 1 to pivot vertically backward and upward to direct the light output toward a ceiling for indirect or bounce-lighting of a subject to be photographed. Pivot 53 can secure housing platform 55 to handle 2 by means including a dished spring washer 54. In turn, mounting platform 55 can be removably secured to housing 1 by fastener 58 by means of slot 59. When housing 1 is removed from handle 2, fastener 58 can be used to secure housing 1 directly to a movie camera by other mounting means. The direct lighting position for housing 1 in relation to handle 2 is determined by angulr stop 56 on the upper end of extensible bar 43 interacting with the bottom of mounting platform 55, and angle 57 allows the housing 1 to be swivelled back to a bounce-lighting position.

The extensible bar 43 is arranged to slide vertically within channel 42 molded into handle 2. The inner bottom 46 of handle 2 limits the downward motion of extensible bar 43, and the stop 47 limits the upward motion by its contact with lug 44 in bar 43. Actually, handle 2 comprises a front half 40 and a rear half 41 held together by fasteners 48, 49 and 50. A spring 51 is mounted inside handle 2 adjacent channel 42 to tend to retain extensible bar 43 in whatever vertical position is chosen for it. If desired, a decal 52 may be used to cover the front faces of screws 49 and 50.

Camera attachment bar 3 can be pivotally attached to handle 2 by fastener 48 in slot 66. Stop 69 in handle 2 prevents camera bar 3 from pivoting beyond the desired horizontal position. Camera bar 3 comprises a flat bar 61, a rubber frictional engagement pad 62 and a knurled thumb screw 63 extending through slot 71 in flat bar 61 and terminating on the camera side of flat bar 61 in a screw threaded end 64. Washer 70 will allow thumb screw 63 to be tightened into a camera and retain its grip.

If it is desired to give a slightly forward tilt to handle 2 in relation to a camera mounted on camera bar 3, this can be readily accomplished by providing a slight clockwise forward twist in the area 72 of attachment bar 3 as indicated by the arrow 73.

While a detailed description of a preferred embodiment of the invention has been given, it will be understood that various changes, ommissions and substitutions may be made within the true spirit and scope of the invention as defined in the appended claims.

What we claim as new and desire to secure by Letters Patent of the United States is:

1. A movie light which comprises:
   a head unit housing having a top portion and a bottom portion, said top and bottom portions being discontinuous so as to provide passages for ambient air to flow vertically through said housing due to cooling convection currents set up by heat coming from heat sources including a lamp mounted within said housing, the forward ends of said top and bottom portions defining at least part of a front opening in said housing, said housing being adapted for attachment to a movie camera to provide illumination of a subject to be photographed;
   a reflector within said front opening, said reflector making only essentially point contacts at at least three points around the periphery of said front opening with raised contacts provided at points spaced around said periphery;

mounting means holding said reflector in position, said mounting means being rigidly secured to the back of said reflector and to a rear portion of said housing, said mounting means also providing a substantial heat dissipating means by being of such a size and shape as to minimize heat conduction and by being located in said housing in the region traversed by said cooling convection currents of air; and physical and electrical connecting means behind said reflector for connecting a lamp, the light producing portion of said lamp being located within said reflector in a position to give the desired light output characteristics.

2. A movie light according to claim 1 in which the reflector mounting means also includes means for dispersing convection currents of hot air arising from the vicinity of the lamp to prevent over-heating of the portion of the movie light structure directly above the vicinity of said lamp.

3. A movie light according to claim 1 mounted on a handle by swiveling means which allows said movie light to be tilted upwardly in relation to said handle so as to provide bounce-lighting as from a ceiling for the indirect illumination of the subject of motion pictures to be taken with a camera to which said handle is attached.

4. A movie light according to claim 1 in which said movie light is mounted on a handle by an extensible means to allow said movie light to be raised vertically above the level of a movie camera to which said handle is attached.

5. A movie light according to claim 1 in which the physical connection means are adapted to permit the positioning of the lamp within the reflector to provide interchangeably both a widely divergent light beam for floodlighting and a narrowly divergent light beam for spotlighting.

References Cited

UNITED STATES PATENTS

| | | | |
|---|---|---|---|
| 1,376,941 | 5/1921 | Johnson | 240—1.3 |
| 1,642,919 | 9/1927 | Cloughley | 240—44 |
| 2,898,447 | 8/1959 | Hanlon | 240—1.3 |
| 3,026,409 | 3/1962 | Deisch | 240—1.3 |
| 3,280,320 | 10/1966 | Beaton et al. | 240—1.3 |

FOREIGN PATENTS 931,905   7/1963   Great Britain.

NORTON ANSHER, *Primary Examiner.*

F. L. BRAUN, *Assistant Examiner.*